(12) United States Patent
Thuler

(10) Patent No.: US 9,343,992 B2
(45) Date of Patent: May 17, 2016

(54) POWER CONVERTER WITH LOW STANDBY POWER CONSUMPTION

(71) Applicant: Peter Albert Thuler, Sai Kung (HK)

(72) Inventor: Peter Albert Thuler, Sai Kung (HK)

(73) Assignee: WEP CONSULTING (HK)

(*) Notice: Subject to any disclaimer, the term of this patent is extended or adjusted under 35 U.S.C. 154(b) by 72 days.

(21) Appl. No.: 13/746,581

(22) Filed: Jan. 22, 2013

(65) Prior Publication Data

US 2014/0204631 A1    Jul. 24, 2014

(51) Int. Cl.
*H02M 5/45*     (2006.01)
*H02M 5/458*    (2006.01)
*H02M 1/00*     (2006.01)

(52) U.S. Cl.
CPC ...... *H02M 5/458* (2013.01); *H02M 2001/0032* (2013.01); *Y02B 70/16* (2013.01)

(58) Field of Classification Search
USPC ............... 363/34, 35, 36, 37, 40, 41, 44
See application file for complete search history.

(56) References Cited

U.S. PATENT DOCUMENTS

| | | | | |
|---|---|---|---|---|
| 5,719,759 | A * | 2/1998 | Wagner et al. | 363/132 |
| 6,462,964 | B2 * | 10/2002 | Porter et al. | 363/21.01 |
| 2006/0233000 | A1 * | 10/2006 | Akagi | 363/37 |
| 2006/0279968 | A1 * | 12/2006 | Iida | 363/21.01 |
| 2010/0244775 | A1 * | 9/2010 | Smith | 320/140 |
| 2012/0327690 | A1 * | 12/2012 | Melanson | 363/16 |

* cited by examiner

*Primary Examiner* — Nguyen Tran
(74) *Attorney, Agent, or Firm* — Galbreath Law Offices, P.C.; John A. Galbreath

(57) ABSTRACT

A power converter for converting an AC input of between frequency F1 at voltage V1 and frequency F2 at voltage V2 into a stable AC output of frequency F3 and voltage V3 comprises an AC/DC/AC/AC/DC converter (100) that converts the AC input power (between F1, V1 to F2, V2) into a DC output DC1 as a function of the input (F1, V1 or F2, V2) and an inverter (200) that converts the DC output DC1 into an AC output AC2 of frequency F3 and voltage V3.

6 Claims, 5 Drawing Sheets

POWER CONVERTER WITH LOW STANDBY POWER CONSUMPTION

The present invention relates to an AC/DC/AC/AC/DC/AC power converter, especially to a power converter with low power consumption, in particular which complies with the ErP Directive (ecodesign requirements for energy-related products).

Power converters with low standby power consumption already exist. For instance, U.S. Pat. No. 8,199,543 describes a mechanism for a power converter with extremely low standby power consumption to shut off AC power and drive the power converter into a standby state with low power consumption without the need of any additional switch. This document deals only with an AC to DC power converter.

Many patents and devices deal with low standby consumption especially in connection with the ErP Directive's requirements. In fact, producers must comply with the new directives which implicate constant innovation.

The aim of the present invention is to propose an AC/AC power converter, especially a power converter with extremely low standby power consumption.

According to the invention, a power converter for converting an AC input of between frequency F1 at voltage V1 and frequency F2 at voltage V2 into a stable AC output of frequency F3 and voltage V3 comprises an AC/DC/AC/AC/DC/AC converter which is composed of an AC/DC/AC/AC/DC converter that converts the AC input power (between F1, V1 to F2, V2) into a DC output DC1 irrespective of the input (between F1, V1 to F2, V2) and an inverter that converts the DC output DC1 into an AC output AC2 of frequency F3 and voltage V3.

The invention could be summarized as an AC/DC/AC/AC/DC/AC converter. A rectifier is an electrical device that converts alternating current AC, which periodically reverses direction, to direct current DC, which flows in only one direction. Rectifiers have many uses, but are often found serving as components of DC power supplies and high-voltage direct current power transmission systems. The DC output power converted by the rectifier is coupled in an input of an inverter or power inverter. This power inverter is an electrical power converter that changes direct current (DC) to alternating current (AC). Thus we build an AC/DC/AC/AC/DC/AC converter.

The power converter according to the invention can be used with an AC input voltage of 90-260 V, taking into account voltage variations, for many devices which would need an AC output power and a standardized output frequency. It could also be used in domestic products such as electric toothbrushes, electric shavers to name a few.

The invention will be more clearly understood from the following description of a preferred embodiment, which is given by way of example only, with reference to the accompanying schematic drawings, in which.

The following description is presented to enable the use of the present invention. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

According to the invention, a power converter for converting an AC input between frequency F1 at voltage V1 and frequency F2 at voltage V2 into a stable AC output of frequency F3 and voltage V3 comprises a rectifier 100 that converts the AC input power (between F1, V1 and F2, V2) into a DC output DC1 irrespective of the input (between F1, V1 to F2, V2) and an inverter 200 that converts the DC output DC1 into an AC output AC2 of frequency F3 and voltage V3.

Figure 1:
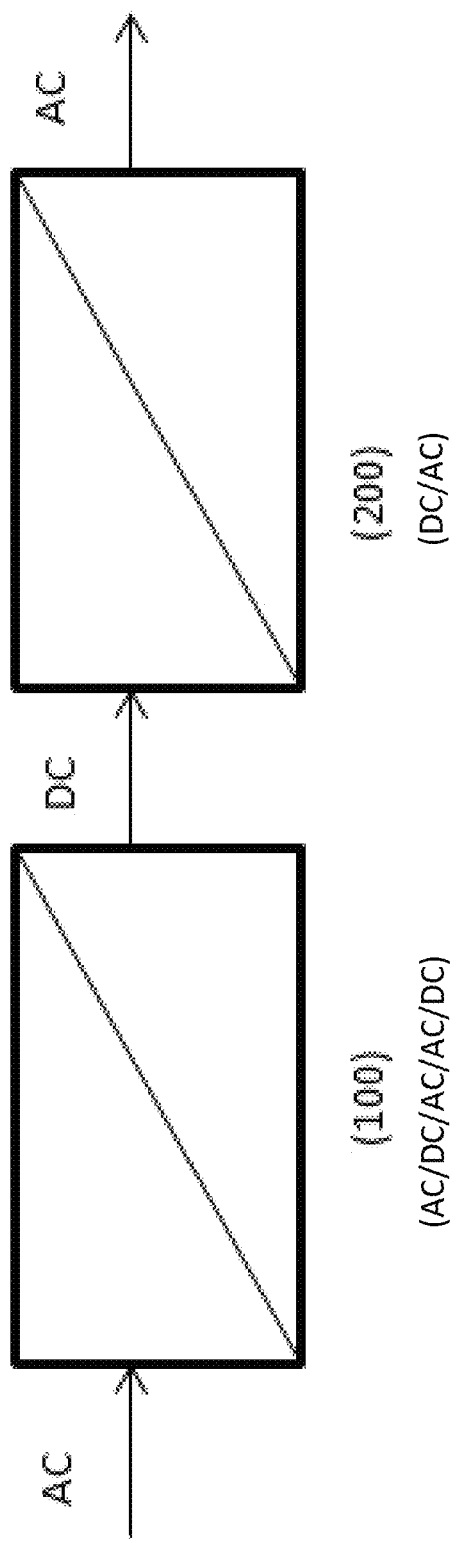
FIG. 1 shows a block diagram of a power converter according to the invention according to one embodiment.

As shown in FIG. 1, which is a simplified block diagram of a power converter according to the invention, the power converter according to a preferred embodiment of the invention is used to convert an external AC to a DC power, then a AC/AC conversion, followed by a AC/DC conversion and lastly a DC/AC conversion for supplying a device. The power converter comprises an AC/DC/AC/AC/DC converter part 100 and a DC/AC converter part 200 (inverter).

The part 100 has an input rectifier 101, a filter 102, an inverter stage 103, a HF step down transformer 104, an output rectifier 105 and filter 106. The input voltage AC1 is typically 90-260 V (e.g. nominally 120V or 240V). The input rectifier part 101 produces an unregulated DC voltage which is filtered by filter 102. The inverter stage 103 converts DC, from the rectifier stage described above, to AC voltage into the transformer primary, driven by a PWM oscillator (103'). The transformer 104 provides power conversion and isolation between the primary AC mains input side of the power supply and the secondary side of the transformer. As a DC output is required, the AC output from the transformer 104 is rectified by the output rectifier 105. The rectified output is then smoothed by a filter 106 consisting of capacitors.

The AC/DC converter, rectifier part 100, can be a single rail with center tap or a single rail configuration and it can be with multiple output voltage and voltage stabilizer. The multiple output voltage (+/−5V) can be used for instance for the frequency generator and the wave form generator (or any other logical circuits powered with 5 V) whereas another output voltage (+/−20V; or any other desired voltage) can be used for powering the load.

In the power converter according to the invention, the AC input is typically nominally 220/230 or 240 V, 50 Hz or 110/120V, 60 Hz.

However, standard voltages range from 100 to 120 V 50 and 60 Hz and 200/220/230/240, mainly 50 Hz.

The output frequency F3 is typically in the range 54-56 Hz and the output voltage V3 is typically 12-20V for our particular application.

The rectifier part 100 comprises a PWM, Pulse Width Modulation power switch.

The DC/AC converter, inverter 200, comprises a timer part 201, a waveform generator, a switching controller and output stage 202. In a preferred embodiment, the frequency generated is 55 Hertz. This frequency can be achieved by a simple timer, for example U1 in FIG. 3, and an R/C oscillator at the nominal frequency or a higher frequency oscillator, either R/C oscillator or quartz, and a frequency divider. The waveform generator is driven by the frequency generator. The waveform generator allows to produce a positive and a negative pulse, including the gaps in between to ensure that the two power switches (transistors, FET'S, . . . ) are never on at the same time. The intermediate DC/AC converter described in this invention works with a High frequency AC of 20-100 kHz. The level shifters, switching controller in part 202, drive the load switches at for example 20V with a 5V signal voltage. The push/pull output stage, allows to switch the power to the load. The output voltage V3 can be for example 18V and depends on the device plugged.

Figure 3:
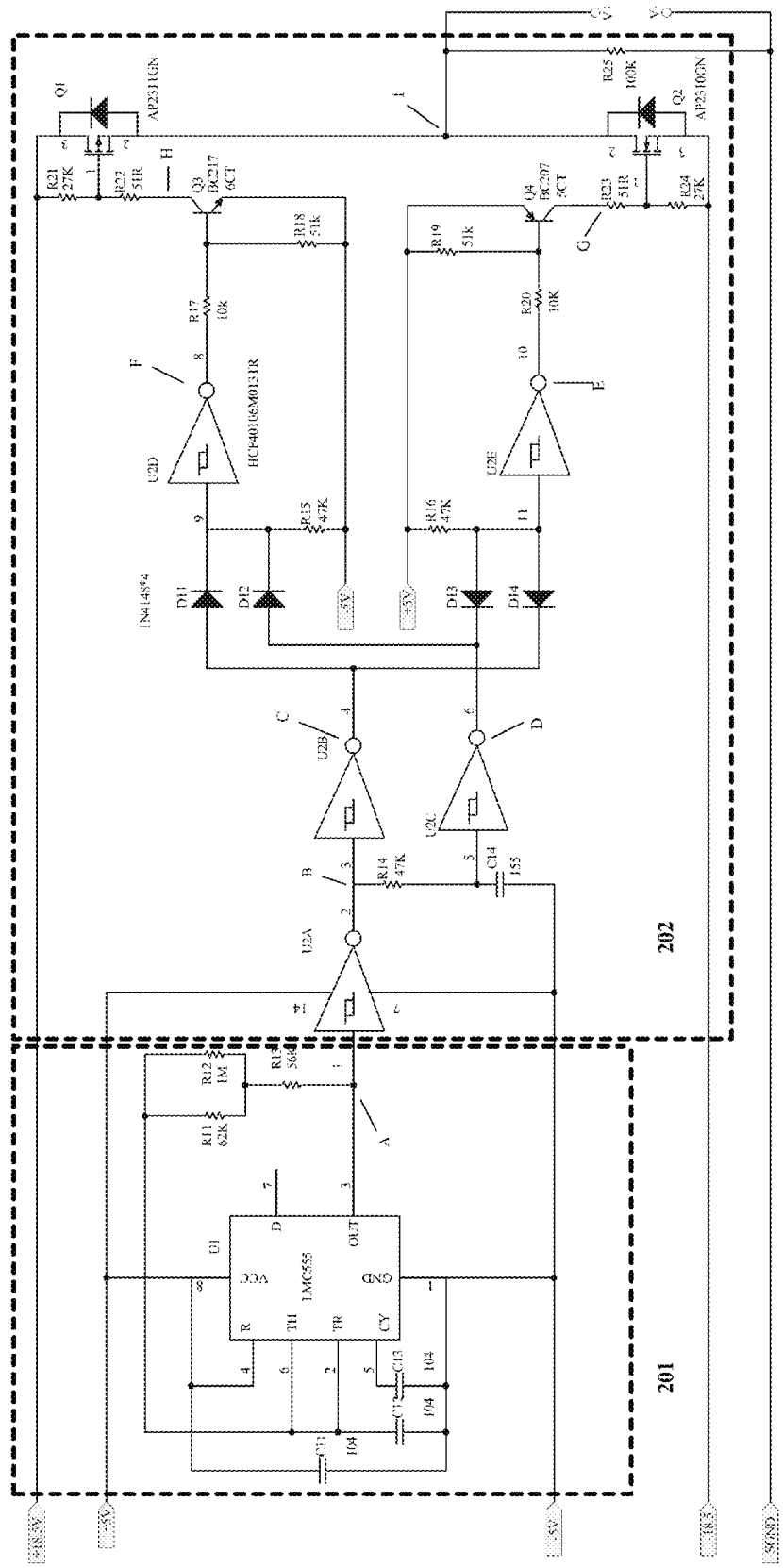
FIG. 3 is a circuit diagram of a second converter part of a power converter according to one embodiment.
Figure 4:
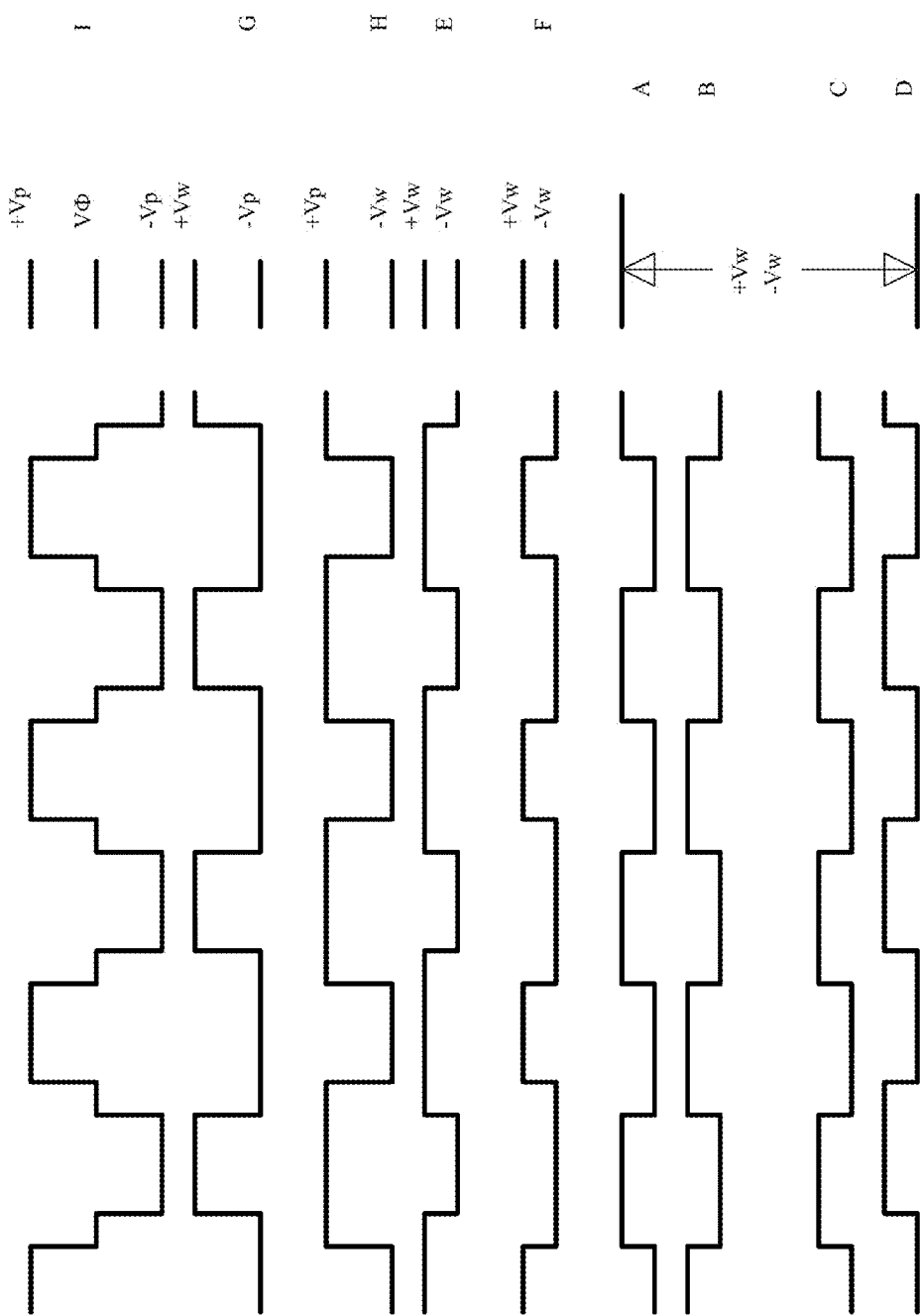
FIG. 4 shows a graphic diagram of signals in one of the components used in the second converter part.

In FIG. 4 we can see a graphic diagram of signals A to I from corresponding different points of the circuit board, as indicated in FIG. 3 in the second converter (200). Each signal line corresponds to a specific point from the second converter (200). A shows the input of the oscillator signal. B shows the output inverted signal of the oscillator. I shows the output alternative signal.

The device includes a "wave form generator" to produce a signal to drive a push pull power switching device in such way that it is ensured that both switches can never be on at the same time which would result in a short circuit. This would not be a problem because the SMPS has an automatic overload and short circuit protection, but incidents where both power switches are on at the same time would result in reduced efficiency.

This power supply or converter according to the invention, can be used for many devices which need an AC power like some electric toothbrushes which can be driven by an oscillating permanent magnet motor.

Figure 2:
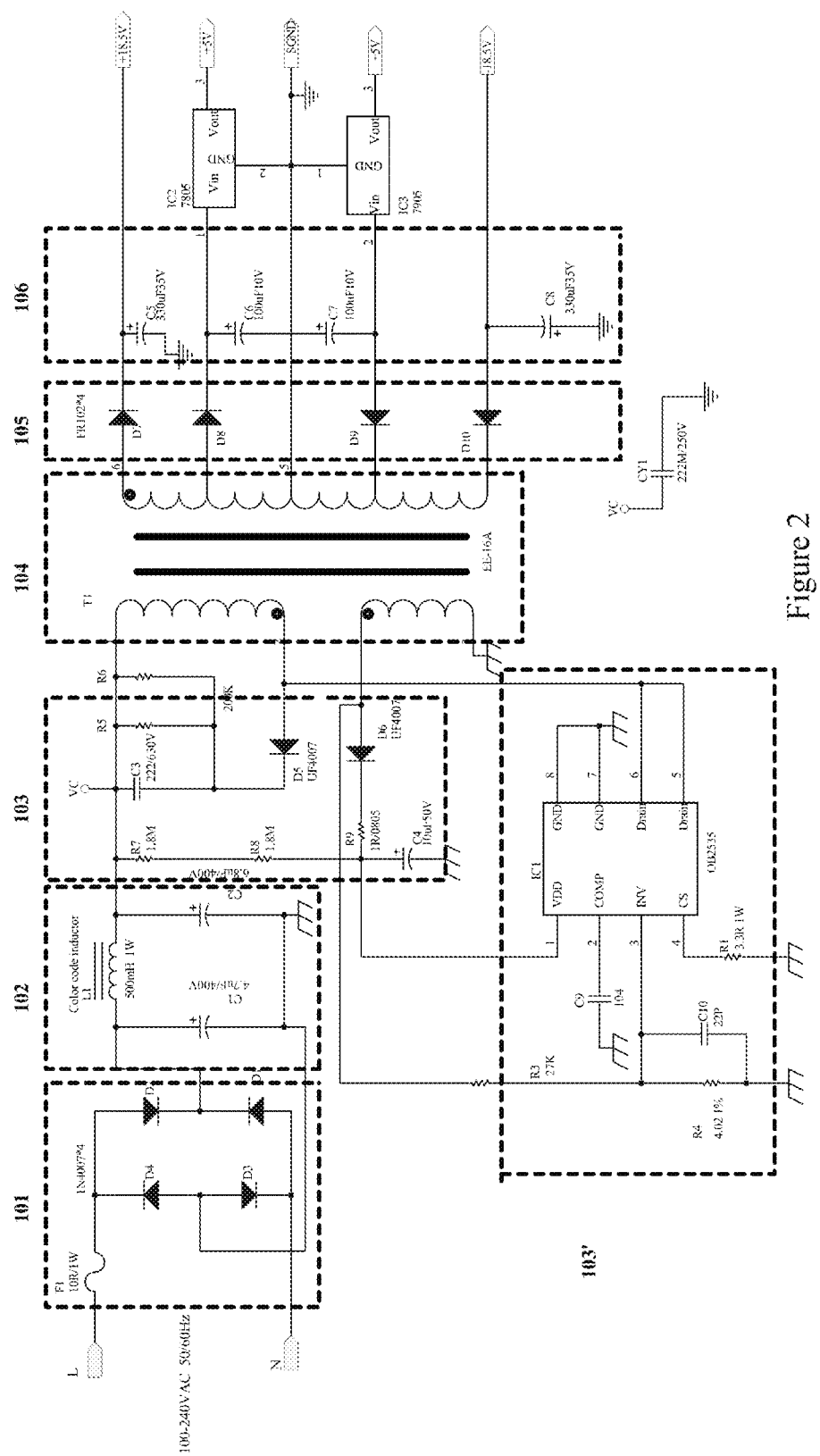
FIG. 2 is a circuit diagram of a first converter part of a power converter according to one embodiment.

The inventive power converter can have a standby power consumption which does not exceed the maximum allowed by ErP, presently 0.5 W for AC/AC convertors, but in this case are typically 0.2 Watt. Some measurements have been done to check the consumption when a device, for example a toothbrush, is in OFF mode and when the device is on a ON position. These results are presented in table 1 and are done with the power converter as shown in FIG. 2 and FIG. 3.

TABLE 1

| | SMPS Sample No. | | | | | | | | |
|---|---|---|---|---|---|---|---|---|---|
| | 1# | | 2# | | 3# | | 4# | | Unit |
| Input Voltage | 120 | 230 | 120 | 230 | 120 | 230 | 120 | 230 | Vac |
| 1) Output Rating when device in OFF position | | | | | | | | | |
| 1a) Output Voltage | 17.6 | 17.6 | 17.6 | 17.6 | 17.6 | 17.6 | 17.6 | 17.6 | Vac |
| 1b) Output Current | 0 | 0 | 0 | 0 | 0 | 0 | 0 | 0 | mAac |
| 1c) Output Power | 0 | 0 | 0 | 0 | 0 | 0 | 0 | 0 | W |
| 1d) Frequency | 57/60 | 58.8 | 56/58 | 56.2 | 58.8 | 58.1 | 57.5 | 57.5 | Hz |
| 1e) Stand-by input current | 1.50 | 0.80 | 1.40 | 0.80 | 1.60 | 0.90 | 1.20 | 0.80 | mAac |
| 1f) Stand-by Input Power | 0.18 | 0.18 | 0.17 | 0.18 | 0.19 | 0.20 | 0.14 | 0.18 | VA |
| 2) Output Rating when device in ON @ 1step | | | | | | | | | |
| 2a) Output Voltage | 17.6 | 17.6 | 17.6 | 17.6 | 17.6 | 17.6 | 17.6 | 17.6 | Vac |
| 2b) Output Current | 106 | 105 | 100 | 97 | 102 | 102 | 100 | 101 | mAac |
| 1c) Output Power | 1.87 | 1.85 | 1.76 | 1.71 | 1.80 | 1.80 | 1.76 | 1.78 | W |
| 2c) DC offset current | 0 | 0 | 0 | 0 | 0 | 0 | 0 | 0 | Adc |
| 2d) Frequency | 57.5 | 58 | 55.5 | 55.5 | 57.0 | 57 | 57.5 | 57.0 | Hz |
| 1e) Input current | 16.0 | 9.5 | 16.5 | 9.2 | 16.5 | 9.4 | 16.4 | 9.4 | mAac |
| 2e) Input Power | 1.92 | 2.19 | 1.98 | 2.12 | 1.98 | 2.16 | 1.97 | 2.16 | VA |
| 2f) Rotation Angle | 32 | 30 | 34 | 34 | 32 | 32 | 33 | 32 | Degre |

The tests have been done on four devices and for input voltage 120V and 230V. We can clearly see from line 1*f*) in table 1, that the consumption in standby mode does not exceed 0.2 W, which is below the present requirement of the ErP's directives.

These tests have been done with some specific values and can vary according to the value of the components or the tolerance of each component. See below a specification of components which has been used to realize the measurements but it must be considered as an example, and the indicated values can be varied while still producing the same result. An example of specific values is given in Table 2.

TABLE 2

| Specification of components for FIGS. 2 and 3 | | |
|---|---|---|
| Description | QTY | REFERENCE |
| SMD-RES 1206 200 KΩ, ±5%, ¼ W | 2 | R5, R6 |
| SMD-RES 1206 1.8 MΩ, ±5%, ¼ W | 2 | R8, R7 |
| SMD-RES 1206 1.0 MΩ, ±5%, ¼ W | 1 | D15 |
| SMD-RES 1206 51 Ω, ±5%, ¼ W | 2 | R22, R23 |
| SMD-RES 1206 27 KΩ, ±5%, ¼ W | 2 | R21, R24 |
| SMD-RES 1206 100 KΩ, ±5%, ¼ W | 1 | R25 |
| SMD-RES 0805 3.6 KΩ, ±1%, ⅛ W | 1 | R4 |
| SMD-RES 0805 1.0 Ω, ±1%, ⅛ W | 1 | R9 |
| SMD-RES 0805 22 KΩ, ±1%, ⅛ W | 1 | R3 |
| SMD-RES 0805 62 KΩ, ±1%, ⅛ W | 1 | R11 |

TABLE 2-continued

Specification of components for FIGS. 2 and 3

| Description | QTY | REFERENCE |
|---|---|---|
| SMD-RES 0805 1.0 MΩ, ±5%, ⅛ W | 1 | R12 |
| SMD-RES 0805 51 KΩ, ±5%, ⅛ W | 2 | R18, R19 |
| SMD-RES 0805 56 KΩ, ±5%, ⅛ W | 1 | R13 |
| SMD-RES 0805 47 KΩ, ±5%, ⅛ W | 3 | R14, R15, R16 |
| SMD-RES 0805 10 KΩ, ±5%, ⅛ W | 2 | R17, R20 |
| Axial metal film resistor 3.3 Ω, ±1%, 1 W | 1 | R1 |
| E-Cap, 4.7 uF ± 20%, 400 V, 105° C., φ8 × 12, | 1 | C1 |
| E-Cap, 6.8 uF ± 20%, 400 V, 105° C., φ10 × 15 | 1 | C2 |
| Electrolytic Capacitor, 10 uF ± 20%, 50 V, 105° C., Φ5 × 11 | 1 | C4 |
| Low-ESR E-Capr, 330 uF ± 20%, 35 V, 105° C., φ8 × 16, | 2 | C5, C8 |
| Low-ESR E-Capr, 100 uF ± 20%, 10 V, 105° C., φ5 × 11, | 2 | C6, C7 |
| SMD Capacitor, 0.1 uF ± 10%, 50 V, 0805, X7R | 4 | C9, C11, C12, C13 |
| SMD Capacitor, 0.000022 uF ± 10%, 50 V, 0805, X7R | 1 | C10 |
| SMD Capacitor, 0.015 uF ± 10%, 50 V, 0805, X7R | 1 | C14 |
| Polyester film Capacitor 0.0022 uF ± 5%, 630 V, Pin = 5 mm | 1 | C3 |
| Y-CAP, 0.0022 uF ± 20%, 400 V, Y1, F.S.Pin = 10 mm | 1 | CY1 |
| Rectifer, 1N4007; 1000 V/1 A; DO-41; GALAXY. | 4 | D1-D4 |
| UF4007; 1000 V/1 A; DO-41; GALAXY. | 2 | D5, D6 |
| FR102; 100 V/1 A; DO-41; BL | 4 | D7-D10 |
| 1N4148W; 100 V/0.15 A; SOD-123, SEMTECH | 4 | D11-D14 |
| MOS AP2311GN; SOT-23; P | 1 | Q1 |
| MOS AP2310GN; SOT-23; N | 1 | Q2 |
| SMD BC817CT SOT-23 NPN | 1 | Q3 |
| SMD BC807CT SOT-23; PNP | 1 | Q4 |
| SMD IC OB2535ECPA; SOP8; On-Bright. | 1 | IC1 |
| IC VOLT REG 78L05 TO-92 | 1 | IC2 |
| IC VOLT REG 79L05 TO-92 | 1 | IC3 |
| SMD IC HCF40106MOBTR SO-14 ST | 1 | U2 |
| SMD IC LMC555 SO-8 | 1 | U1 |
| Axial color code inductor 0410; 680 uH ± 10%; 1 W | 1 | L1 |
| WAHHING H01130A EE16 10Pin | 1 | T1 |
| MOF METAL OXIDE FILM RESISTOR; 10 Ω, ±5%, 1 W. | 1 | F1 |

Figure 5:
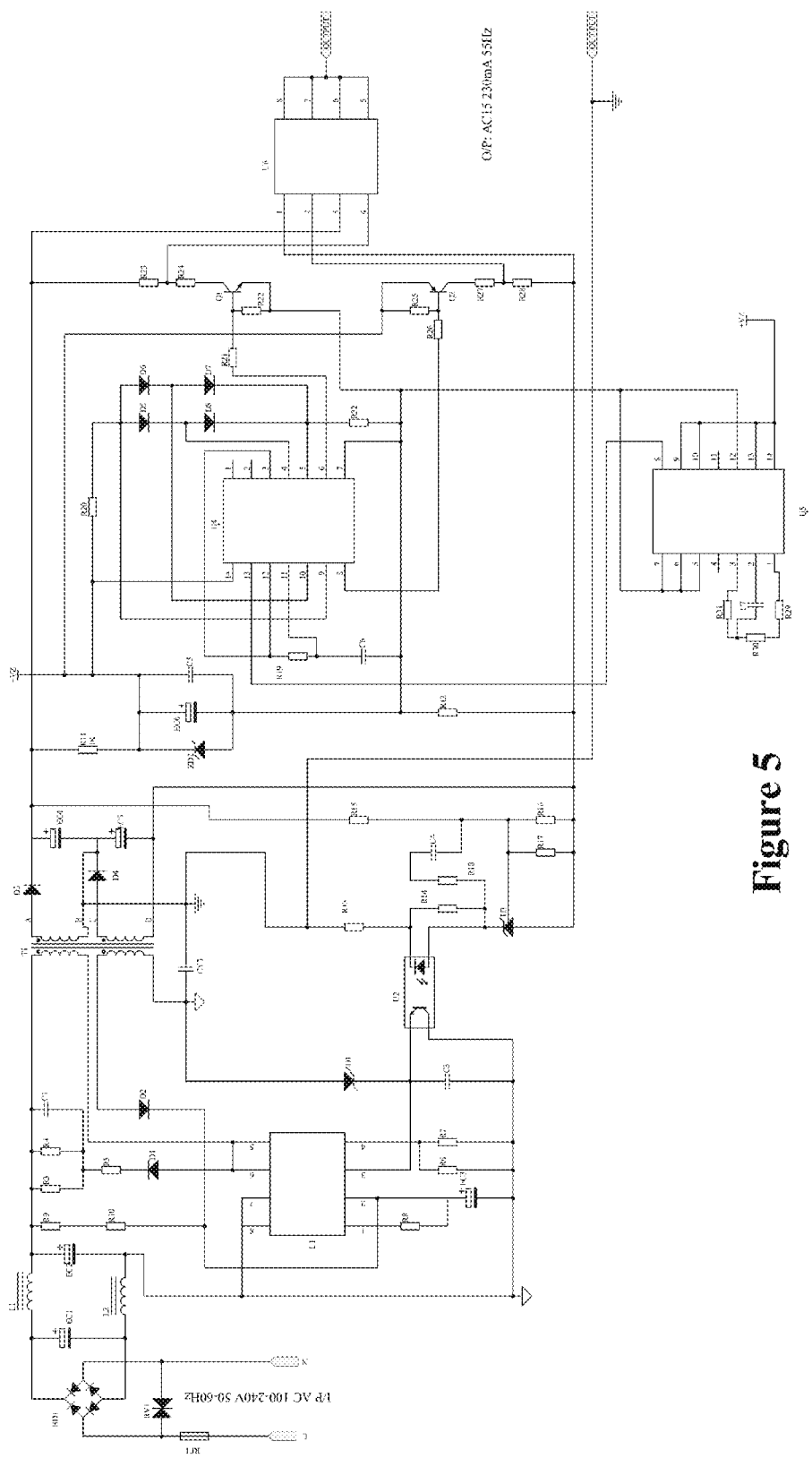
FIG. 5 shows a circuit diagram of another version which is using a higher frequency oscillator and a divider.

The schematic diagram in FIG. 5 shows another embodiment to achieve the same result. In this embodiment, we use a higher frequency oscillator (of around 57 kHz) and a divider (1024).

The schematic diagram shown in FIG. 3 can also use a quartz instead of the R/C oscillator. Most likely, one would use a mass produced quartz in the 30 MHz range and an adequate divider.

The power converter according to the invention acts as a "safety isolating transformer" as defined in standard IEC/EN 61558 and relevant UL standards.

Although the present invention has been described in detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A power converter for converting an AC input of between frequency F1 at voltage V1 and frequency F2 at voltage V2 into a stable AC output of frequency F3 and voltage V3 comprises an AC/DC/AC/AC/DC converter (100) that converts, in only one direction, the AC input power (between F1, V1 to F2, V2) into a DC output DC1 as a function of the input (F1, V1 or F2, V2) and an inverter (200) that converts the DC output DC1 into an AC output AC2 of frequency F3 and voltage V3, wherein the inverter (200) comprises an oscillator, a wave form generator, a switching controller an output stage (202), and at least one electronic switch, said output stage (202) comprising two power switches (Q1, Q2), the power switches (Q1, Q2) having an ON position and an OFF position, wherein when both switches are in the ON position, short circuits are likely to occur, the wave form generator producing a positive pulse and a negative pulse, the positive pulse and negative pulse being separated by a gap to ensure that the two power switches (Q1, Q2) are never ON at the same time, wherein the inverter (200) comprises the wave form generator that comprises an oscillator and a Hex Schmitt trigger, and the power converter, which converts in only one direction, has a standby power consumption which does not exceed 0.5 Watt, and meets ErP and other ecodesign standards.

2. The power converter of claim 1 wherein the AC input is 220V, 50 Hz or 110V, 60 Hz and the output frequency F3 is 54-56 Hz and the output voltage V3 is 15-20V.

3. The power converter of claim 1 or 2 wherein the rectifier (100) comprises a Pulse Width Modulation power switch (PWM).

4. The power converter of claim 1 or 2, which converts AC input to AC output according to the following sequence AC/DC/AC/AC/DC/AC.

5. The power converter of claim 1 or 2, which acts as a safety isolating transformer as defined in standard IEC/EN 61558.

6. The power converter of claim 1, wherein electronic switch is a MOSFET or a bi-polar transistor.

* * * * *